May 5, 1953 R. J. ALTGELT 2,637,262
CLAMPING DEVICE FOR ADJUSTABLY SECURING
TOOL STANDARDS TO PLOW BEAMS
Filed May 20, 1950 2 SHEETS—SHEET 2
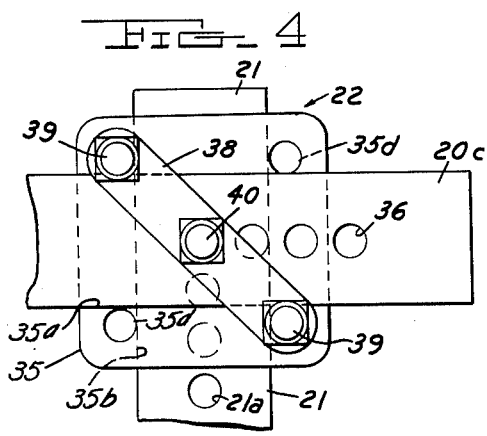
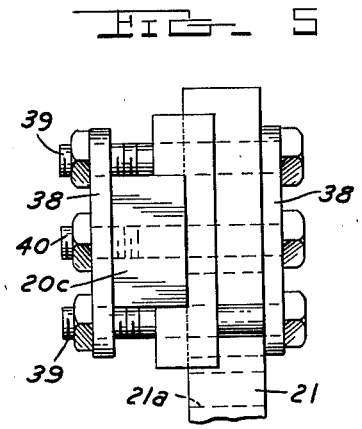
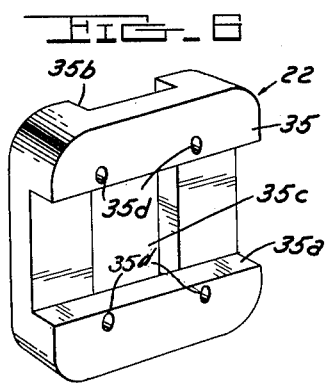
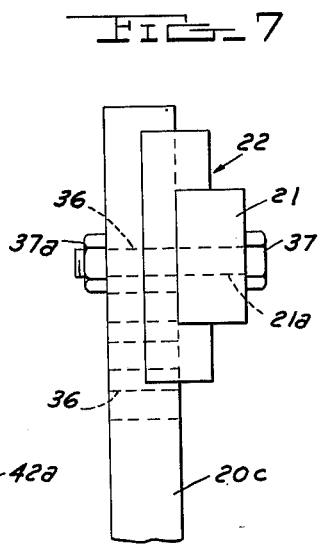
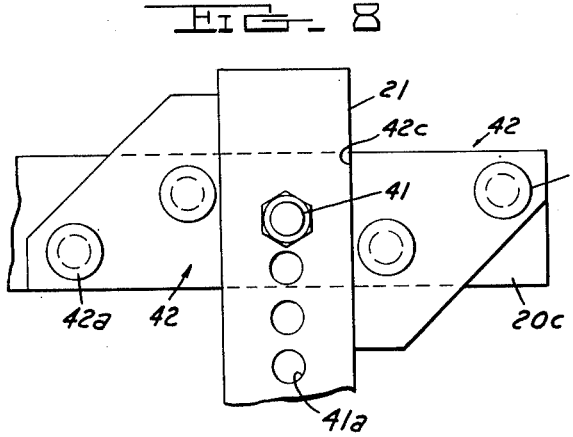
INVENTOR.
Rudolph J. Altgelt
BY
W. W. Schaich
ATTORNEY Patented May 5, 1953

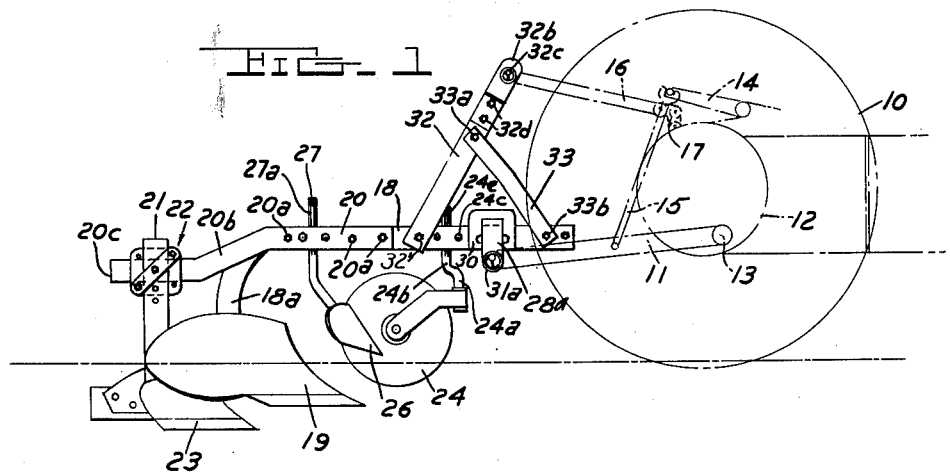
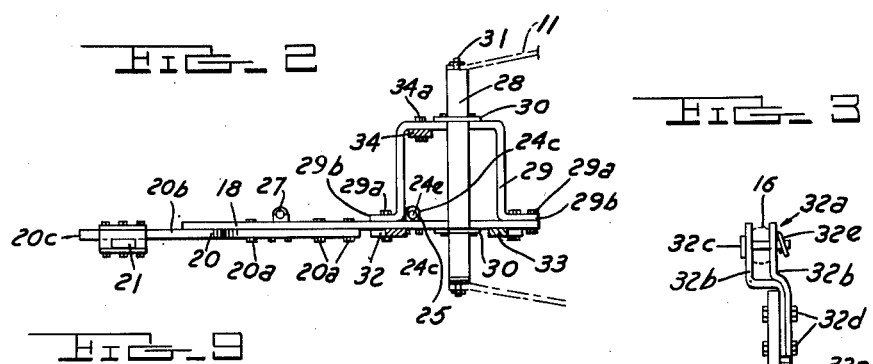
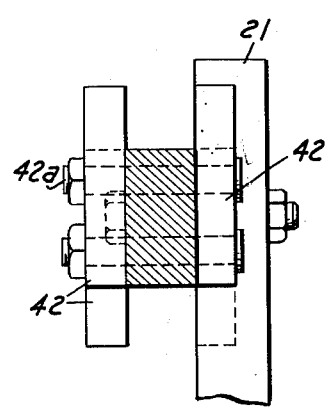
INVENTOR.
Rudolph J. Altgelt

2,637,262

UNITED STATES PATENT OFFICE 2,637,262

CLAMPING DEVICE FOR ADJUSTABLY SECURING TOOL STANDARDS TO PLOW BEAMS

Rudolph J. Altgelt, South Bend, Ind., assignor to Dearborn Motors Corporation, Highland Park, Mich., a corporation of Delaware Application May 20, 1950, Serial No. 163,188

1 Claim. (Cl. 97—198.1)

This invention relates to an improved clamping device for securing a tool bar or standard to a farm implement beam which permits vertical and horizontal adjustment of the tool standard on such beam.

In the operation of plows, cultivators or similar earth tilling implements, the forces working against the tilling tool when such tool is being pulled through the ground are such as to require a substantial clamping or securing device for supporting the tilling tool bar or standard on the implement frame. The tool bar or standard should also be conveniently adjustable both vertically and horizontally to obtain the optimum working position of such tool under various conditions.

Accordingly, it is an object of this invention to provide an improved clamping device of simple construction to adequately support a tilling tool mounting bar on an earth working implement.

Another object of this invention is to provide an improved clamp for a vertical tool bar or standard which not only securely locks the vertical tool bar in a desired position, but which will permit both vertical and horizontal positioning of such tool bar relative to the frame structure or beam on which such vertical tool bar may be mounted.

The specific nature of this invention, as well as other objects and advantages thereof, will become apparent to those skilled in the art from the following detailed description, taken in conjunction with the attached sheets of drawings on which, by way of preferred example only, are illustrated several embodiments of this invention.

On the drawings:

Fig. 1 is a side elevational view of a plow embodying the clamping device of this invention and showing the plow mounted on the three link implement hitch of a tractor of well known make.

Fig. 2 is a fragmentary plan view of the plow frame.

Fig. 3 is a fragmentary end view of the plow frame.

Fig. 4 is an enlarged detail view of a preferred form of the clamping device.

Fig. 5 is a top view of Fig. 2.

Fig. 6 is a perspective detail view of the clamp member.

Fig. 7 is a plan view of the clamp member showing the single bolt securing means.

Fig. 8 illustrates a modification of the clamping device.

Fig. 9 is an end view of Fig. 8.

As shown on the drawings:

Referring to Fig. 1, there is shown a tractor of well known make indicated generally by the numeral 10 having a pair of transversely disposed, vertically swingable hitch links 11 pivoted to the axle housing 12 as at 13. Draft links 11 are raised by a pair of pivoted lift arms 14 powered by a built-in hydraulic mechanism (not shown). Lift arms 14 are respectively connected to the trailing draft links 11 by connecting rods 15. A top link member 16 is pivotally connected to the top of the axle housing 12 as shown at 17.

A plow frame is mounted on the hitch linkage of the tractor and such frame comprises essentially a plow beam 18 of rectangular bar stock having a depending end portion 18a on which there is mounted a plow bottom 19 of conventional construction. A shorter secondary plow beam 20 is secured to plow beam 18 by a plurality of bolts 20a. Beam 20 extends rearwardly of plow beam 18 and the rearwardly extending portion of beam 20 is provided with an offset portion 20b to drop the rear end portion 20c of beam 20 below the level of the horizontal portion of plow beam 18. A vertically disposed tool bar or standard 21 is secured to the trailing end portion 20c of beam 20 by a clamping device 22 embodying this invention, to be later described. Tool bar 21, or standard as it is sometimes called, may be utilized for mounting a secondary plow bottom 23 rearwardly of and below the plow bottom 19. Plow bottom 23 is also of conventional construction but is somewhat smaller than the front mounted plow bottom for working in the subsoil.

A coulter 24 is conventionally mounted on a vertically disposed crank 24a and such crank is provided with a vertically disposed stem portion 24b. Stem 24b rests within a V-shaped block 25 and both of such members are vertically secured to beam 18 by an eye-bolt 24c which respectively surrounds stem 24b and passes through block 25 as shown in Fig. 2. The stem portion 24b of crank 24a is provided with a knurled or splined exterior surface as shown at 24e which cooperates with V-block 25 and eyebolt 24c to substantially eliminate rotation of crank 24a with but a normal amount of tension on eye-bolt 24c. A jointer 26 is mounted on a vertical shaft 27 secured to beam 18 and such jointer lies adjacent the coulter 24 to also serve as a scraper for the coulter. Jointer shaft 27 may also be knurled or splined as shown at 27a and fastened to beam 18 in a similar manner as coulter 24.

Plow beam 18 is connected to the trailing draft links 11 of tractor 10 by a drawbar or cross shaft 28 transversely supported by beam 18 and a U-shaped frame 29 (Fig. 2). Frame 29 has out-turned ends 29b which are bolted to beam 18 by bolts 29a. Drawbar 28 is preferably rectangular in cross section and is secured transversely of beam 18 and the bight portion of arm 29 by a pair of clamping plates 30 respectively secured to beam 18 and arm 29, each plate 30 being apertured to receive drawbar 28. Drawbar 28 is laterally positioned by loosening plates 30 and shifting such drawbar to the desired location and then reclamping plates 30. Reference may be had to my copending application for Plow Frame, Serial No. 128,846 filed November 22, 1949, for a further description of such clamping plates. One end of drawbar 28 is downwardly bent as shown at 28a in Fig. 1 and mounting pins 31 are respectively horizontally secured in each end of drawbar 28, pins 31 being preferably shrunk into suitable holes (not shown) in the ends of drawbar 28.

Draft links 11 are respectively mounted on mounting pins 31 and are secured thereon by linch pins 31a. A forwardly sloping arm 32 (Figs. 1 and 3) is fastened to beam 18 by a transverse bolt 32' and such arm is supported by a pair of braces 33 and 34 respectively sloped forwardly and laterally (Figs. 1 and 3). Brace 33 is secured at its upper end to arm 32 by a transverse bolt 33a positioned intermediate the ends of such arm as shown in Fig. 1 while the other end of brace 33 is secured to the forward end of beam 18 by a bolt 33b. Brace 34 secures arm 32 against lateral displacement and such brace is secured at its upper end to arm 32 by the same bolt 33a utilized to fasten brace 33 to such arm. The other end of brace 34 is secured to the bight portion of arm 29 by a bolt 34a (Figs. 2 and 3). A fork 32a comprising a pair of strap members 32b each being respectively offset to form the forked portion are fastened to the upper end of arms 32 by a pair of transverse bolts 32d. Top link 16 is pivotally secured within fork 32a by a transverse bolt 32c. A linch pin 32e secures bolt 32c on fork 32a.

Clamp 22 (Figs. 4 and 6) utilized for adjustably securing tool standard 21 to plow beam 18 comprises essentially a rectangular block 35 having a horizontally disposed groove 35a formed in one side of such block. Groove 35a has a depth equal to one-half the thickness of block 35 and has a width equal to the depth of the end portion 20c of beam 20. A vertically disposed groove 35b is provided on the opposite side of block 35. Groove 35b accommodates standard 21 and such groove also has a depth equal to one-half of the thickness of block 35 thus a rectangular opening 35c is produced where grooves 35a and 35b meet.

Alternatively, the clamping member 22 shown in Figs. 4 and 6 may be constructed by welding together two pairs of parallel bars each pair of bars being respectively transversely spaced to accommodate the beam 18 and standard 21.

In Figs. 1 and 7 the clamping device of this invention is shown in assembled relation on the plow frame. In such relation, end portion 20c of plow beam 20 lies in groove 35a while the standard 21 lies or fits within the vertical groove 35b of clamping member 22. A plurality of transverse, longitudinally spaced holes 36 are provided in end portion 20c of beam 20 to receive a bolt 37. A plurality of transverse holes 21a are provided in standard 21 in vertically spaced relationship and such holes likewise receive bolt 37. Thus when end portion 20c and standard 21 are assembled to clamping device 22 as shown in Fig. 7, bolt 37 will then secure such members together. By suitably aligning transverse holes 36 and 21a, the standard 21 can be adjusted vertically and longitudinally to any desired position relative to end portion 20c and such adjustment is limited only by the number of holes provided.

I preferably provide a transverse hole 35d in each of the corners of block 35 adjacent the rectangular opening 35c and substantially tangent to grooves 35a and 35b. A pair of strap members 38 are then provided to secure horizontal end portion 20c of beam 20 and vertical standard 21 within the horizontal and vertical grooves in block 35. Each of such strap members are diagonally disposed as shown in Fig. 4, one of such strap members lying contiguous to the outside surface of standard 21 while the other such strap member is contiguous to the outside of horizontal end portion 20c as shown in Fig. 5. A suitable transverse hole is provided in each end of strap members 38 which align with diagonally opposed holes 35b thus permitting a bolt 39 to be passed through each side of aligned transverse holes to thereby secure the various members in a desired position of adjustment. A centrally disposed bolt 40 passes through aligned selected holes 36 in horizontal end portions 20c and 21a in standard 21 to lock the standard 21 and end portion 20c in the selected position of adjustment.

A modified clamping device is illustrated in Figures 8 and 9. The construction shown in such figure is somewhat simpler and comprises essentially a pair of blocks which are securable on opposite sides of the standard to thus prevent rocking movement of such standard when mounted on the plow beam. In this modification the same standard 21 is shown mounted on the end portion 20c of beam 20. Standard 21 is secured in a desired position of vertical adjustment to beam end portion 20c by a transverse bolt 41. Such bolt is selectively insertable in one of a plurality of holes 41a provided in vertically aligned spaced relationship in standard 21. A pair of substantially triangular shaped block members 42 are secured by rivets 42a to the end portion 20c on opposite sides of standard 21 as shown in Figs. 8 and 9 and on opposite sides of beam end portion 20c. In effect blocks 42 define vertical grooves 42c which permit mounting of standard 21 on either side of beam end 20c. It will be noted that with this modification no longitudinal adjustment of standard 21 along projecting end portion 20c is permitted.

From the above description it is readily apparent that there is here provided a novel clamping device which will positively lock a tool standard to an implement frame against displacement caused by ground reaction forces on the tool. Such clamping device is inexpensively produced and permits a tool bar to be quickly and readily assembled to or disassembled from the plow beam.

It will, of course, be understood that various details of construction may be varied through a wide range without departing from the principles of this invention and it is, therefore, not the purpose to limit the patent granted hereon otherwise than necessitated by the scope of the appended claim.

I claim:

In combination, an elongated implement beam having a plurality of spaced apertures therealong, an upright tool standard also having a plurality of spaced apertures along the length thereof for selective registry with the apertures of said beam to accommodate relative beam-standard longitudinal and vertical adjustment, a clamping plate having spaced surfaces on opposing sides thereof slidably engaging said beam and said tool standard respectively, said clamping plate surfaces being defined by opposing recesses having a common open center through which the beam and tool standard are in surface contact and which accommodates communication of registering beam and standard apertures, said clamping plate also having bolt apertures lying outside of said open center and diagonally aligned with the registering apertures of said beam and said tool standard when the same are assembled, clamping straps contacting said beam and said tool standard respectively and extending diagonally thereacross to oppose attempted standard movement during implement working, each of said straps having a pair of end apertures communicating with said plate apertures and a central aperture communicating with the registered apertures of said beam and said standard, a central securing bolt extending through the central apertures of said straps and through registering apertures of said beam and said standard, and additional securing bolts extending through said end apertures to secure said beam, said standard and said clamping plate into an integrated supporting structure with said tool standard being longitudinally and vertically adjustable relative to said beam upon merely removing the single central bolt and sliding the standard and the beam relative to the clamping plate.

RUDOLPH J. ALTGELT.

References Cited in the file of this patent

UNITED STATES PATENTS

| Number | Name | Date |
|---|---|---|
| 340,506 | Heidacker | Apr. 20, 1886 |
| 1,830,013 | Bohmker | Nov. 3, 1931 |